United States Patent
Wu et al.

(10) Patent No.: US 11,231,800 B2
(45) Date of Patent: Jan. 25, 2022

(54) TOUCH SUBSTRATE, TOUCH SCREEN, AND TOUCH DISPLAY APPARATUS

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Xinguo Wu, Beijing (CN); Fengguo Wang, Beijing (CN); Zhixuan Guo, Beijing (CN); Hong Liu, Beijing (CN); Bo Ma, Beijing (CN); Yu Feng, Beijing (CN); Shicheng Song, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/981,153

(22) PCT Filed: Feb. 14, 2020

(86) PCT No.: PCT/CN2020/075303
§ 371 (c)(1),
(2) Date: Sep. 15, 2020

(87) PCT Pub. No.: WO2020/186949
PCT Pub. Date: Sep. 24, 2020

(65) Prior Publication Data
US 2021/0004106 A1 Jan. 7, 2021

(51) Int. Cl.
*G06F 3/041* (2006.01)
*G06F 3/044* (2006.01)

(52) U.S. Cl.
CPC ........ *G06F 3/0412* (2013.01); *G06F 3/0416* (2013.01); *G06F 3/0443* (2019.05)

(58) Field of Classification Search
CPC ...... G06F 3/041; G06F 3/0412; G06F 3/0416; G06F 3/04164; G06F 3/044; G06F 3/0443; G06F 3/0448; G02F 1/13338
See application file for complete search history.

(56) References Cited

U.S. PATENT DOCUMENTS

| | | | |
|---|---|---|---|
| 2013/0100145 A1* | 4/2013 | Zhong | G01J 1/26 345/501 |
| 2017/0090635 A1* | 3/2017 | Kim | G06F 3/044 |

(Continued)

FOREIGN PATENT DOCUMENTS

| | | |
|---|---|---|
| CN | 105677076 A | 6/2016 |
| CN | 105759482 A | 7/2016 |

(Continued)

OTHER PUBLICATIONS

First Office Action for related Chinese Patent Application No. 201910209523.X, dated Jun. 3, 2020; English translation provided (13 pages).

(Continued)

*Primary Examiner* — Ryan A Lubitz
(74) *Attorney, Agent, or Firm* — Procopio, Cory, Hargreaves & Savitch, LLP

(57) ABSTRACT

A touch substrate includes a base, a plurality of touch electrodes arranged in an array on the base, and a plurality of signal lines disposed on a side of the plurality of touch electrodes proximate to or away from the base. The plurality of signal lines include a plurality of touch lines and a plurality of dummy touch lines. At least one of the plurality of touch electrodes is coupled to at least one of the plurality of touch lines. The at least one touch line is configured to (Continued)

transmit touch signals. The at least one touch electrode is coupled to at least one of the plurality of dummy touch lines.

17 Claims, 6 Drawing Sheets

(56) References Cited

U.S. PATENT DOCUMENTS

| | | | |
|---|---|---|---|
| 2017/0090636 A1 | 3/2017 | Ding et al. | |
| 2017/0160845 A1* | 6/2017 | Lee | G02F 1/133345 |
| 2017/0185210 A1* | 6/2017 | Zhou | G06F 3/0412 |
| 2018/0321770 A1* | 11/2018 | Zhou | G02F 1/13338 |
| 2020/0319739 A1* | 10/2020 | Zou | G02F 1/133514 |
| 2021/0004106 A1 | 1/2021 | Wu et al. | |

FOREIGN PATENT DOCUMENTS

| | | |
|---|---|---|
| CN | 107025012 A | 8/2017 |
| CN | 108549170 A | 9/2018 |
| CN | 109947304 A | 6/2019 |
| JP | 3862653 B2 | 12/2006 |
| KR | 20170076187 A | 7/2017 |

OTHER PUBLICATIONS

Second Office Action for related Chinese Patent Application No. 201910209523.X, dated Nov. 11, 2020 English translation provided (11 pages).

Decision of Rejection for related Chinese Patent Application No. 201910209523.X, dated Feb. 2, 2021 English translation provided (10 pages).

* cited by examiner

TOUCH SUBSTRATE, TOUCH SCREEN, AND TOUCH DISPLAY APPARATUS

CROSS-REFERENCE TO RELATED APPLICATIONS

This application is a national phase entry under 35 USC 371 of International Patent Application No. PCT/CN2020/075303 filed on Feb. 14, 2020, which claims priority to Chinese Patent Application No. 201910209523.X, filed on Mar. 19, 2019, titled "TOUCH SUBSTRATE AND TOUCH SCREEN", which are incorporated herein by reference in their entirety.

TECHNICAL FIELD

The present disclosure relates to a field of display technologies, and in particular, to a touch substrate, a touch screen, and a touch display apparatus.

BACKGROUND

With a rapid development of display technologies, touch screens have been popularized in people's daily lives. According to different touch principles, the touch screens include resistive, capacitive and other types of touch screens, in which the capacitive touch screens have advantages such as high positioning accuracy and high sensitivity.

In the capacitive touch screens, a detection of a touch position is made with a touch structure carried by the screen. According to different carrying forms of the touch structure, the capacitive touch screens may include add-on touch screens, on-cell touch screens, and in-cell touch screens. For the in-cell touch screen, the touch structure is embedded in the display screen, which can reduce a thickness of an entire display module and a manufacturing cost.

SUMMARY

According to an aspect, a touch substrate is provided which includes: a base, a plurality of touch electrodes arranged in an array on the base, and a plurality of signal lines disposed on a side of the plurality of touch electrodes proximate to or away from the base. The plurality of signal lines include a plurality of touch lines and a plurality of dummy touch lines, all of which are arranged in a same layer. A first insulating layer is disposed between the plurality of touch electrodes and the plurality of signal lines, a plurality of first vias is provided in the first insulating layer. At least one of the plurality of touch electrodes is coupled to at least one of the plurality of touch lines. The at least one touch line is configured to transmit touch signals. The at least one touch electrode is coupled to at least one of the plurality of dummy touch lines through at least one of the plurality of first vias.

The plurality of signal lines include a plurality of touch lines and a plurality of dummy touch lines. At least one of the plurality of touch electrodes is coupled to at least one of the plurality of touch lines. The at least one touch line is configured to transmit touch signals. The at least one touch electrode is coupled to at least one of the plurality of dummy touch lines.

In some embodiments, the plurality of touch lines and the plurality of dummy touch lines are arranged in a same layer.

In some embodiments, among a plurality of columns of touch electrodes formed by arranging the plurality of touch electrodes, at least one column of touch electrodes includes n touch electrodes which are coupled to n of the plurality of touch lines, respectively, where n is greater than or equal to 2.

In some embodiments, the touch substrate further includes a first insulating layer disposed between the plurality of touch electrodes and the plurality of signal lines. A plurality of first vias are provided in the first insulating layer. Each of the at least one touch electrode is coupled to the at least one touch line through at least one of the plurality of first vias. The touch electrode is coupled to the at least one dummy touch line through at least one of the plurality of first vias.

In some embodiments, among first vias corresponding to the touch electrode, first vias corresponding to the touch line(s) and first vias corresponding to the dummy touch line(s) are staggered in a column direction.

In some embodiments, among first vias corresponding to the touch electrode, at least one first via is not on a same straight line extending in a row direction as other ones.

In some embodiments, among touch lines coupled to the touch electrode, at least one touch line is coupled to the touch electrode through 2 to 3 first vias; and/or, among the dummy touch lines coupled to the touch electrode, at least one dummy touch line is coupled to the touch electrode through 2 to 3 first vias.

In some embodiments, a contact area between at least one of the plurality of first vias and one touch line or dummy touch line is 15 μm$^2$ to 18 μm$^2$.

In some embodiments, each of the at least one touch electrode is coupled to at least two of the plurality of dummy touch lines. For the touch line(s) coupled to the touch electrode and the touch line(s) that pass the touch electrode but are not coupled to the touch electrode, a dummy touch line coupled to the touch electrode is disposed between two adjacent touch lines.

In some embodiments, for the touch line(s) coupled to the touch electrode, the touch line(s) that pass the touch electrode but are not coupled to the touch electrode, and at least two dummy touch lines coupled to the touch electrode, the touch lines and the dummy touch lines are alternately arranged at intervals.

In some embodiments, the touch substrate further includes a plurality of connection lines disposed on a side of the plurality of signal lines proximate to or away from the base. The touch line(s) and the dummy touch line(s) to which each of the at least one touch electrode is coupled are coupled together through at least one of the plurality of connection lines.

In some embodiments, the touch substrate further includes a second insulating layer disposed between the plurality of connection lines and the plurality of signal lines. A plurality of second vias are provided in the second insulating layer. The touch line(s) coupled to the touch electrode are coupled to the at least one connection line through at least one of the plurality of second vias. The dummy touch line(s) coupled to the touch electrode are coupled to the at least one connection line through at least one of the plurality of second vias.

In some embodiments, an extension direction of the plurality of signal lines intersects with an extension direction of the plurality of connection lines.

In some embodiments, in the touch substrate, the plurality of touch electrodes are configured to transmit common voltage signals, so that the plurality of touch electrodes are also used as common electrodes.

In some embodiments, the touch substrate further includes a plurality of data lines and a plurality of gate lines.

The plurality of signal lines are parallel to the plurality of data lines. The plurality of connection lines are parallel to the plurality of gate lines.

In some embodiments, the plurality of touch lines and the plurality of dummy touch lines are in a same layer as the plurality of data lines, and are of a same material as the plurality of data lines. The plurality of connection lines are in a same layer as the plurality of gate lines, and are of a same material as the plurality of gate lines.

According to another aspect, a touch screen is provided, which includes the touch substrate described in any one of the above embodiments.

According to yet another aspect, a touch display apparatus is provided which includes the touch substrate described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly. Obviously, the accompanying drawings to be described below are merely the ones for some embodiments of the present disclosure, and other drawings can be obtained according to these drawings for a person of ordinary skill in the art. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Figure 1:
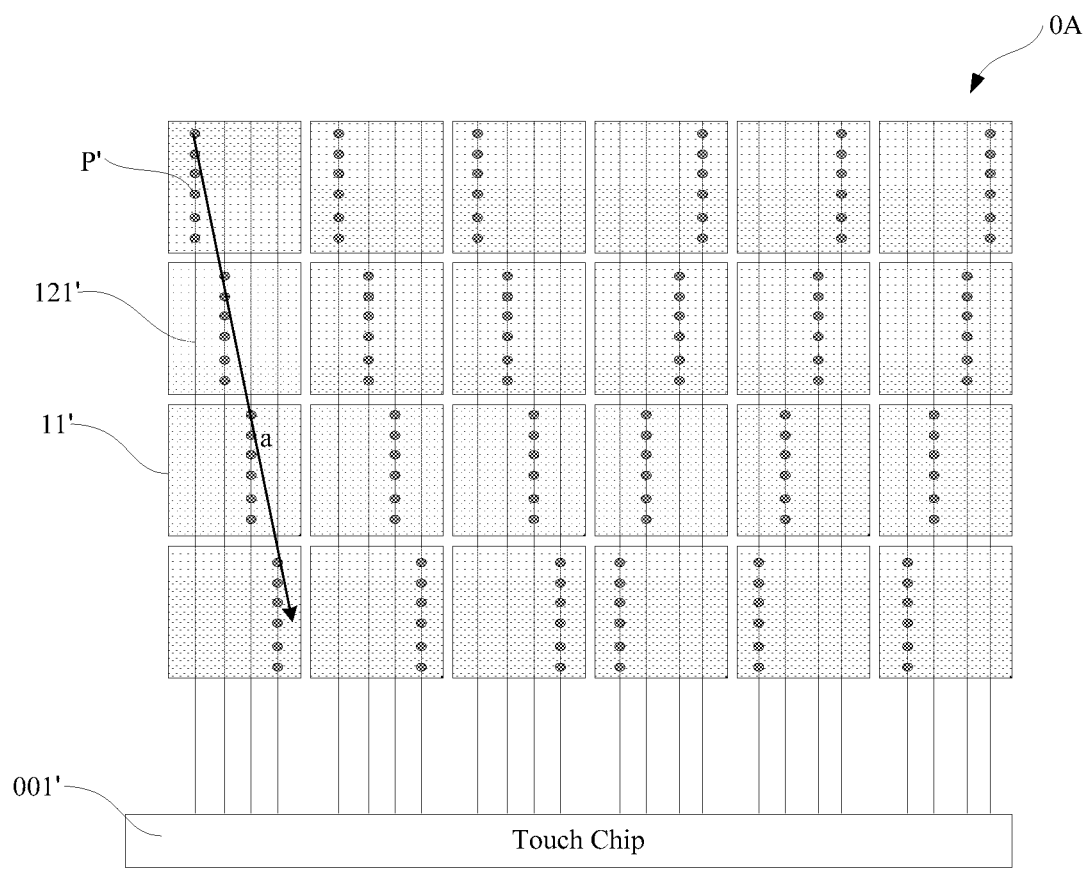
FIG. 1 is a top view of a touch substrate in the related art.

Technical solutions in some embodiments of the present disclosure will be described clearly and completely in combination with accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are interpreted as open and inclusive, i.e., "including, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any or more embodiments or examples in any suitable manner.

Terms such as "first" and "second" are only used for descriptive purposes and are not to be interpreted as indicating or implying a relative importance or implicitly indicating the number of indicated technical features below. Thus, features defined by the terms "first" and "second" may explicitly or implicitly include one or more of the features. In the description of the embodiments of the present disclosure, term "a plurality of/the plurality of" means two or more unless otherwise specified.

In the description of some embodiments, orientations or positional relationships indicated by terms "central", "upper", "lower", "front", "rear", "left", "right", "vertical", "horizontal", "top", "bottom", "inner", "outer", etc. are based on orientations or positional relationships shown in the drawings, which is merely to facilitate and simplify the description of the present disclosure, and is not to indicate or imply that the referred devices or elements must have a particular orientation, or must be constructed or operated in a particular orientation. Therefore, they should not be interpreted as limitations to the present disclosure.

In the description of some embodiments, terms such as "coupled" and "connected" and their derivatives may be used. For example, term "connected" may be used in the description of some embodiments to indicate that two or more components are in direct physical or electrical contact with each other. As another example, term "coupled" may be used in the description of some embodiments to indicate that two or more components are in direct physical or electrical contact. The term "coupled" or "communicatively coupled", however, may also mean that two or more components are not in direct contact with each other, but yet still cooperate or interact with each other. The embodiments disclosed herein are not necessarily limited in this context.

"At least one of A, B, and C" has a same meaning as "at least one of A, B, or C", and both include the following combinations of A, B, and C: only A, only B, only C, a combination of A and B, a combination of A and C, a combination of B and C, and a combination of A, B, and C.

"A and/or B" includes the following three combinations: only A, only B, and a combination of A and B.

In some cases, embodiments involving "row direction" may be implemented in the case of "column direction", and vice versa. After being rotated by 90° or being mirrored, the technical solutions described in the present disclosure also belong to the scope of the claims of the present disclosure.

In the related art, as shown in FIG. 1, a touch substrate 0A is provided. The touch substrate 0A includes a plurality of touch electrodes 11' arranged in a matrix, and a plurality of touch lines 121' coupled to the plurality of touch electrodes 11'. The plurality of touch lines 121' are coupled to a touch chip 001'.

Each column of touch electrodes 11' corresponds to some of the plurality of touch lines 121'. The some touch lines 121' are coupled to the touch electrodes 11' in the column in one-to-one correspondence.

The plurality of touch electrodes 11' and the plurality of touch lines 121' are located in different conductive layers between which an insulating layer is provided.

With continued reference to FIG. 1, a plurality of vias P' are provided in the insulating layer. Each of the plurality of touch lines 121' is coupled to one of the plurality of touch electrodes 11' through some of the plurality of vias P' (which are, by way of example, illustrated to be six vias P' in FIG. 1).

A first column of touch electrodes 11' in FIG. 1 is taken as an example.

The column of touch electrodes 11' includes four touch electrodes 11' which correspond to four touch lines 121'. A first touch line 121' is coupled to a touch electrode 11' in a first row of the column of touch electrodes 11' through some vias P', a second touch line 121' is coupled to a touch electrode 11' in a second row of the column of touch electrodes 11' through some vias P', a touch line 121' in a third column is coupled to a touch electrode 11' in a third row of the column of touch electrodes 11' through some vias P', and a touch line 121' in a fourth column is coupled to a touch electrode 11' in a fourth row of the column of touch electrodes 11' through some vias P'.

It should be noted here that an n-th row herein refers to an n-th row counted from top to bottom in a column direction (referring to a longitudinal direction in FIG. 1). An m-th column refers to an m-th column counted from left to right in a row direction (referring to a horizontal direction in FIG. 1). An x-th line refers to an x-th line counted from left to right in the row direction.

In each column of touch electrodes 11', vias P' corresponding to each touch electrode 11' are concentratedly distributed in an extension direction of the touch lines 121' corresponding to the column of touch electrodes 11'. As such, the vias P corresponding to the column of touch electrodes 11' are regularly and concentratedly arranged in a same direction, and are provided in a large number for a transmission reliability of a touch signal on each touch electrode 11', which results in an occurrence of a superimposed brightness mura.

The first column of touch electrodes 11' in FIG. 1 is still taken as an example.

A straight line of brightness mura is formed corresponding to the touch electrode 11' in the first row of the column of touch electrodes 11' and the first touch line 121', a straight line of brightness mura is formed corresponding to the touch electrode 11' in the second row of the column of touch electrodes 11' and the second touch line 121', a straight line of brightness mura is formed corresponding to the touch electrode 11' in the third row of the column of touch electrodes 11' and the third touch line 121', and so on. A cumulative effect may be that an oblique line of mura (as indicated by the oblique line shown by an arrow a in FIG. 1) occurs in an image displayed on a display screen including the touch substrate. Therefore, a phenomenon of regular display unevenness may occur when the display screen displays images, resulting in a decreased product yield.

Figure 2:
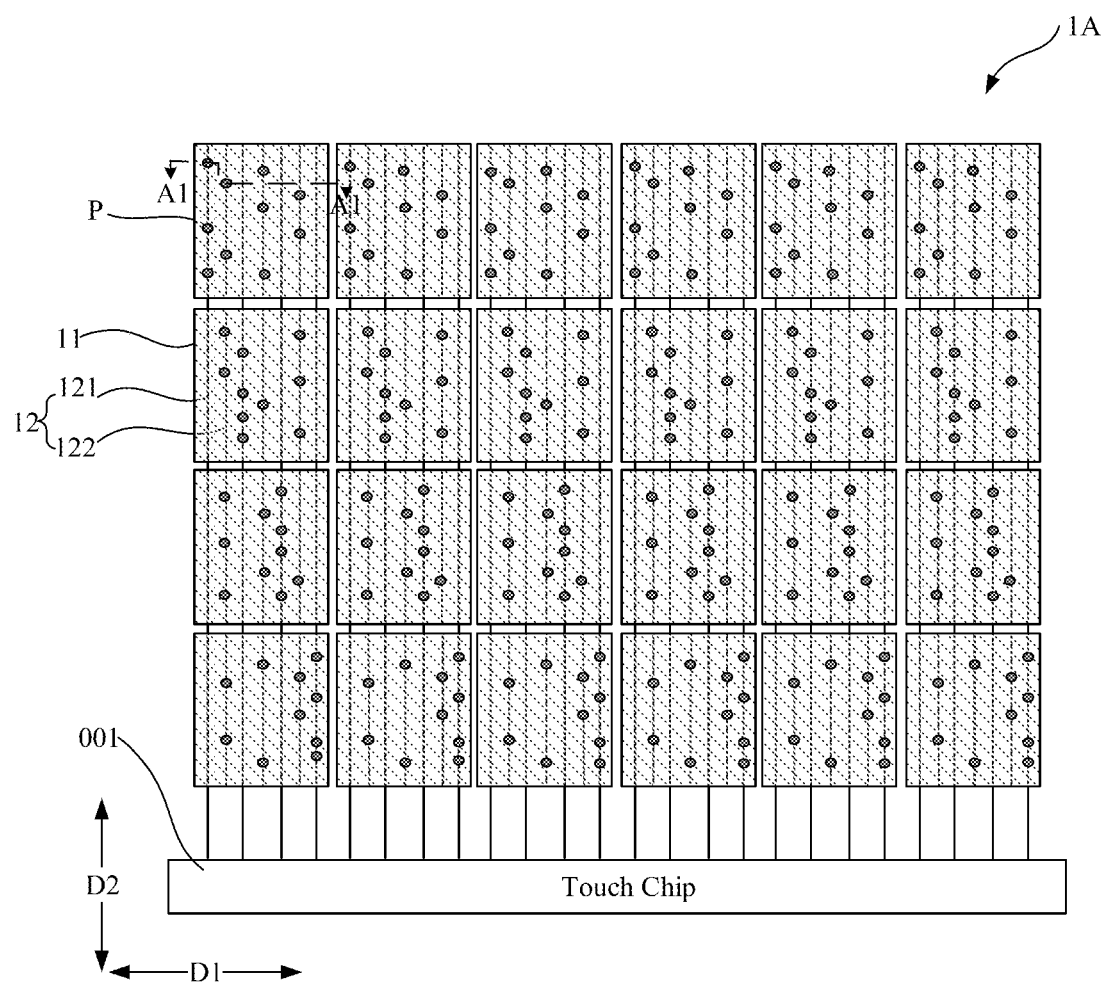
FIG. 2 is a top view of a touch substrate, according to some embodiments of the present disclosure.
Figure 3:
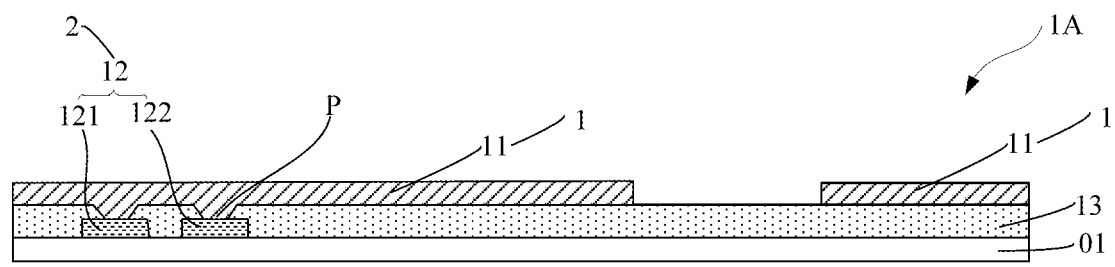
FIG. 3 is a schematic cross-sectional view of the touch substrate shown in FIG. 2 taken along the section line A1-A1, only showing two of the lines.

As shown in FIGS. 2 and 3, some embodiments of the present disclosure provide a touch substrate 1A. The touch substrate 1A includes a base 01, a plurality of touch electrodes 11, and a plurality of signal lines 12. The plurality of signal lines 12 include a plurality of touch lines 121 and a plurality of dummy touch lines 122, which are all arranged in a same layer.

Referring to FIG. 3, the plurality of touch electrodes 11 are provided on the base 01. That is, a first conductive layer 1 is provided on a side of the base 01, and the first conductive layer 1 includes the plurality of touch electrodes 11. Referring to FIG. 2, the plurality of touch electrodes 11 are arranged in an array.

It should be noted that the plurality of touch electrodes 11 are independent block electrodes, which are insulated from each other. For example, as shown in FIG. 2, for the plurality of touch electrodes 11, there is a gap between any two adjacent touch electrodes 11.

In some embodiments, as shown in FIG. 2, the array arrangement may be a matrix arrangement. The matrix arrangement may be arranged in m rows and n columns, where m and n are positive integers, m is greater than or equal to 2, and n is greater than or equal to 2. For example, the plurality of touch electrodes 11 in FIG. 2 are arranged in 4 rows and 6 columns. It is assumed that a row direction in which the plurality of touch electrodes 11 are arranged is a first direction D1 and a column direction in which the plurality of touch electrodes 11 are arranged is a second direction D2. It can be understood that the row direction and the column direction in which the plurality of touch electrodes 11 are arranged intersect with each other. That is, the first direction D1 and the second direction D2 intersect with each other. For example, the first direction D1 and the second direction D2 are perpendicular to each other.

Referring to FIG. 3, the plurality of signal lines 12 are disposed on a side of the plurality of touch electrodes 11 proximate to or away from the base 01. For example, as shown in FIG. 3, the plurality of signal lines 12 are closer to the base 01 relative to the plurality of touch electrodes 11. As another example, in some other embodiments, the plurality of signal lines 12 are further away from the base 01 relative to the plurality of touch electrodes 11.

With continued reference to FIG. 3, the plurality of signal lines 12 include the plurality of touch lines 121 and the plurality of dummy touch lines 122, which are all arranged in a same layer. That is, the touch substrate 1A in the embodiments of the present disclosure includes a second conductive layer 2 provided on a side of the first conductive layer 1 proximate to or away from the base 01, and the second conductive layer 2 includes the plurality of touch lines 121 and the plurality of dummy touch lines 122.

In a case where the plurality of touch lines 121 and the plurality of dummy touch lines 122 are arranged in a same conductive layer (i.e., the second conductive layer 2), the plurality of touch lines 121 and the plurality of dummy touch lines 122 may be formed by a same patterning process. Therefore, there is no need to separately set steps of forming respective touch lines 121 and dummy touch lines 122, which achieves an effect of simplifying a manufacturing process of the touch substrate 1A.

It can be understood that in the touch substrate 1A in the embodiments of the present disclosure, an insulating layer for isolation is provided between different conductive layers. Therefore, as shown in FIG. 3, in a case where the plurality of touch lines 121 and the plurality of dummy touch lines 122 are arranged in a same layer, the touch substrate 1A in the embodiments of the present disclosure further includes a first insulating layer 13 provided between the plurality of touch electrodes 11 and the plurality of signal lines 12. That is, the touch substrate 1A in the embodiments of the present disclosure further includes the first insulating layer 13 provided between the first conductive layer 1 (including the plurality of touch electrodes 11) and the second conductive layer 2 (including the plurality of signal lines 12).

Referring to FIGS. 2 and 3, a plurality of first vias P are provided in the first insulating layer 13.

With continued reference to FIG. 2, at least one of the plurality of touch electrodes 11 is coupled to at least one of the plurality of touch lines 121 through at least one of the plurality of first vias P.

The touch line 121 is configured to transmit touch signals. That is, touch lines 121 of the plurality of touch lines 121 coupled to the touch electrodes 11 are configured to transmit touch signals. For example, the touch lines 121 of the plurality of touch lines 121 coupled to the touch electrodes 11 are connected to a touch chip 001 through which the transmission of the touch signals can be realized. For example, as shown in FIG. 2, each of the plurality of touch lines 121 is coupled to a touch electrode 11, and each of the plurality of touch lines 121 is connected to the touch chip 001 through which the transmission of the touch signals can be realized.

For example, each of the plurality of touch electrodes 11 is coupled to one or some (two or more) of the plurality of touch lines 121 through at least one of the plurality of first vias P. In this way, the plurality of touch electrodes 11 are all used to realize a touch function, which may improve a touch accuracy.

For example, each of the plurality of touch electrodes 11 is coupled to one touch line 121 through one first via P.

For example, as shown in FIG. 2, each of the plurality of touch electrodes 11 is coupled to one touch line 121 through a plurality of first vias P, such as two, three or four first vias P. FIG. 2 illustrates an example in which each touch electrode 11 is coupled to one touch line 121 through three or four first vias P. For example, the touch electrode 11 in a first column and a first row is coupled to the first touch line 121 through three first vias P. For example, the touch electrode 11 in the first column and a second row is coupled to the second touch line 121 through four first vias P.

In the touch substrate 1A in the embodiments of the present disclosure, at least one of the plurality of touch electrodes 11 is coupled to at least one of the plurality of touch lines 121, to realize a detection of a touch position. The touch electrode 11 may be a self-capacitance electrode, and its working principle is: when a human finger touches the touch substrate 1A, a coupling capacitance between the finger and the touch electrode 11 changes, and this change is transmitted to the touch chip 001 in a form of electrical signals through the touch lines 121 coupled to the touch electrode 11, so that the touch chip 001 may recognize the touch position.

Referring to FIG. 2, the at least one touch electrode 11 is coupled to at least one of the plurality of dummy touch lines 122 through at least one of the plurality of first vias P.

For example, each of the at least one touch electrode 11 is coupled to one of the plurality of dummy touch lines 122 through at least one of the plurality of first vias P.

For example, as shown in FIG. 2, each of the at least one touch electrode 11 is coupled to some (two or more) of the plurality of dummy touch lines 122 through ones of the plurality of first vias P (FIG. 2 illustrates an example in which each touch electrode 11 is coupled to three dummy touch lines 122).

It should be noted that the dummy touch lines 122 are not connected to the touch chip 001, to prevent the touch chip 001 from obtaining the touch signals through the dummy touch lines 122 coupled to the touch electrodes 11, thereby avoiding a signal interference. The dummy touch lines 122 coupled to different touch electrodes 11 are not connected, to avoid a signal crosstalk between the different touch electrodes 11, thereby avoiding an influence on a positioning accuracy for the touch position.

For example, the touch electrode 11 is coupled to one dummy touch line 122 through one first via P.

For example, the touch electrode 11 is coupled to one dummy touch line 122 through multiple first vias P, such as two, three or four first vias P. FIG. 2 illustrates an example in which each touch electrode 11 is coupled to a dummy touch line 122 through two or three first vias P. For example, the touch electrode 11 in the first column and the first row is coupled to a first dummy touch line 122 corresponding to this touch electrode 11 through two first vias P. For example, the touch electrode 11 in the first column and the first row is coupled to the second dummy touch line 122 corresponding to this touch electrode 11 through three first vias P.

It can be understood that the touch electrode 11 is coupled to the touch line 121 through the first vias P distributed in the first insulating layer 13 at positions corresponding to the touch line 121. The touch electrode 11 is coupled to the dummy touch line 122 through the first vias P distributed in the first insulating layer 13 at positions corresponding to the dummy touch line 122.

Compared with the related art in which each touch electrode 11' is coupled to a touch line 121' only through first vias P' concentratedly distributed in the insulating layer 13 at positions corresponding to the touch line 121', in the touch substrate 1A in the embodiments of the present disclosure, the plurality of first vias P may be distributed in the first insulating layer 13 at different positions corresponding to the touch lines 121 and the dummy touch lines 122, so as to realize a dispersedly distribution of the first vias P, and avoid the brightness mura caused by the concentrated distribution of the plurality of first vias P in a same direction (i.e., an extension direction of the plurality of touch lines 121). Therefore, a phenomenon of regular display unevenness can be avoided.

Therefore, in the touch substrate 1A in the embodiments of the present disclosure, each block of touch electrode 11 may be coupled to the touch line 121 and the dummy touch line 122 through the first vias P distributed at the positions of the first insulating layer 13 corresponding to the touch line 121 and the dummy touch line 122, respectively. In this way, the first vias P' concentratedly distributed along the touch line 121' in the related art can be dispersed, so as to avoid the phenomenon of regular display unevenness on a premise of not reducing a contact area between the touch electrode 11 and the signal line 12 and ensuring a touch sensitivity.

In some embodiments, as shown in FIG. 2, the plurality of touch electrodes 11 are arranged in a plurality of columns (which are, by way of example, illustrated to be six columns in FIG. 2). At least one column of the plurality of columns of touch electrodes 11 includes n touch electrodes 11 which are coupled to n touch lines 121 of the plurality of touch lines 121, respectively, where n is greater than or equal to 2.

In some embodiments, each touch electrode 11 included in each column of the plurality of columns of touch electrodes 11 is coupled to one touch line 121.

For example, as shown in FIG. 2, a first column of touch electrodes 11 of the plurality of touch electrodes 11 is taken as an example.

The column of touch electrodes 11 includes four touch electrodes 11 which correspond to four touch lines 121. A first touch line 121 is coupled to the touch electrode 11 in a first row of the column of touch electrodes 11, a second touch line 121 is coupled to the touch electrode 11 in a second row of the column of touch electrodes 11, a third touch line 121 is coupled to the touch electrode 11 in a third row of the column of touch electrodes 11, and a fourth touch line 121 is coupled to the touch electrode 11 in a fourth row of the column of touch electrodes 11. With regard to other columns of touch electrodes 11, they can be deduced by analogy.

Based on this, in the touch substrate 1A in the embodiments of the present disclosure, at least one of the plurality of touch electrodes 11 is coupled to at least one touch line 121, and the at least one touch electrode 11 is coupled to at least one dummy touch line 122. In this way, after the touch signals are transmitted by the at least one touch line 121 to a coupling position on the corresponding touch electrode 11 (a position where the touch line 121 is connected to the touch electrode 11), the touch signals can be transmitted by the at least one dummy touch line 122 to other positions on the touch electrode 11, and therefore a transmission speed and uniformity of the touch signals on the touch electrode 11 may be improved. Furthermore, the positioning accuracy for the touch position is improved when a function of detecting the touch position of the touch substrate 1A is implemented, thus improving the touch accuracy. In addition, a provision of the at least one dummy touch line 122 may also reduce a resistance difference and a capacitance difference between the touch electrodes 11, so as to improve the touch accuracy.

In the touch substrate 1A in the embodiments of the present disclosure, the number of the touch lines 121 coupled to each touch electrode 11 and the number of the dummy touch lines 122 coupled to each touch electrode 11 may be set as required.

For example, an 18:9 full high definition (FHD) screen is taken as an example.

A resolution of the 18:9 FHD screen can reach approximately 1920 by 1080, i.e., a 1080P screen. The number of the touch line(s) 121 to which each touch electrode 11 of the 1080P screen is coupled is one, and the number of the dummy touch line(s) 122 to which each touch electrode 11 of the 1080P screen is coupled is 24. That is, the number of signal lines 12 (including the touch line 121 and the dummy touch lines 122) corresponding to each touch electrode 11 of the 1080P screen is 25.

Referring to FIG. 2, in some embodiments, among first vias P corresponding to the touch electrode 11, first vias P corresponding to the touch lines 121 and first vias P corresponding to the dummy touch lines 122 are staggered in the column direction (i.e., the second direction D2). In this way, the first vias P may be further dispersedly distributed, so as to avoid the brightness mura caused by the concentrated distribution of the first vias P in the same direction (i.e., the extension direction of the plurality of touch lines 121 and the plurality of dummy touch lines 122). Therefore, the phenomenon of regular display unevenness can be avoided.

Based on this and with continued reference to FIG. 2, in some embodiments, among the first vias P corresponding to the touch electrode 11, at least one first via P is not on a same straight line extending in the row direction (i.e., the first direction D1) as other first vias P. That is, at least one straight line which is drawn to pass through the at least one first via P and extend in the row direction does not pass through other first vias P within a range of the touch electrode 11.

In this way, the first vias P may be still further dispersedly distributed, so as to avoid the brightness mura caused by the concentrated distribution of the first vias P in the same direction (i.e., the extension direction of the plurality of touch lines 121 and the plurality of dummy touch lines 122). Therefore, the phenomenon of regular display unevenness can be avoided.

For example, the 18:9 FHD screen is still taken as an example. The number of the first vias P corresponding to each touch electrode 11 is approximately 32. In the embodiments of the present disclosure, by distributing 32 first vias P in the first insulating layer 13 at positions corresponding to the aforementioned 25 signal lines 12 (one of which is the touch line 121 or the dummy touch line 122), in which the number of the first vias P in the first insulating layer 13 at the positions corresponding to one signal line 12 is 1 to 2, a concentration of the first vias P in a longitudinal direction (i.e., the second direction D2) can be avoided. In addition, any one of the 32 first vias P is not provided on a same straight line extending in the row direction (i.e., the first direction D1) as other ones, so as to avoid a concentration of the first vias P in a horizontal direction (i.e., in the first direction D1).

The larger contact area between one signal line 12 (the signal line 12 is the touch line 121 or the dummy touch line 122) and the touch electrode 11, the more beneficial it is to improve a reliability and conductivity of the coupling between the signal line 12 and the touch electrode 11, and the more beneficial it is to reduce a touch load of the touch electrode 11. Therefore, on a premise of avoiding a phenomenon of the longitudinal concentration of the first vias P, the number of the first vias P through which the signal line 12 is coupled to the touch electrode 11 may be increased to enlarge the contact area between the signal line 12 and the touch electrode 11, thereby improving the reliability and conductivity of the coupling between the signal line 12 and the touch electrode 11 and reducing the touch load of the touch electrode 11.

For example, the 18:9 FHD screen is still taken as an example. The number of the first vias P through which at least one of the touch lines 121 that are coupled to the touch electrode 11 is coupled to the touch electrode 11 is increased from 1 or 2 to 2 or 3, or to 3 or 4.

For example, the 18:9 FHD screen is still taken as an example. The number of the first vias P through which at least one of the dummy touch lines 122 that are coupled to the touch electrode 11 is coupled to the touch electrode 11 is increased from 1 or 2 to 2 or 3, or to 3 or 4.

Since the contact area between the signal line 12 and the touch electrode 11 may be enlarged by increasing the number of the first vias P, in some embodiments, in a case where the number of the first vias P is set to be large, an area of each first via P may be appropriately reduced on a premise of ensuring a sufficient contact area between the signal line 12 and the touch electrode 11 (the contact area may be such that there is a good reliability and conductivity of the coupling between the signal line 12 and the touch electrode 11). In this way, the brightness mura can be further avoided due to a reducing of the area of each first via P.

For example, the 18:9 FHD screen is still taken as an example.

In the related art, an area of each first via P' of the 18:9 FHD screen is approximately 20 $\mu m^2$ to 25 $\mu m^2$. After the number of the first vias P through which each touch electrode 11 is coupled to a corresponding signal line 12 is increased from 1 or 2 to 2 to 4, the area of the first via P (that is, an area of the touch electrode 11 contacting the signal line 12 through this first via P) can be reduced to prevent the brightness mura due to a concentration of the first vias P with a large area. For example, as shown in FIGS. 2 and 3, the contact area between at least one of the plurality of first vias P and one touch line 121 or one dummy touch line 122 is 15 μm² to 18 μm².

In some embodiments of the present disclosure, each of at least one of the plurality of touch electrodes 11 is coupled to at least two of the plurality of dummy touch lines 122. The manner in which the at least two dummy touch lines 122, the touch lines 121 coupled to the touch electrode 11, and the touch lines 121 that pass the touch electrode 11 but are not coupled to the touch electrode are arranged includes but is not limited to the following:

For the touch line(s) 121 coupled to the touch electrode 11 and the touch line(s) 121 that pass the touch electrode 11 but are not coupled to the touch electrode 11, a dummy touch line 122 coupled to the touch electrode 11 is provided between two adjacent touch lines 121. In this way, it is beneficial for the first vias P corresponding to the touch electrode 11 to be dispersedly distributed in the first direction D1, thereby facilitating avoiding the concentration of the first vias P in the horizontal direction.

For example, for the touch line(s) 121 coupled to the touch electrode 11, the touch line(s) that pass the touch electrode 11 but are not coupled to the touch electrode, and the at least two dummy touch lines coupled to the touch electrode, the touch lines and the dummy touch lines are alternately arranged at intervals.

For example, as shown in FIG. 2, the touch electrode 11 in the first column and the first row is taken as an example.

The touch electrode 11 is coupled to a touch line 121 which is a first touch line 121, and coupled to three dummy touch lines 122 which are a first dummy touch line 122, a second dummy touch line 122, and a third dummy touch line 122. There are three touch lines 122 that pass the touch electrode 11 but are not coupled to the touch electrode 11, and the three touch lines 121 are a second touch line 121, a third touch line 121, and a fourth touch line 121. The first dummy touch line 122 is provided between the first touch line 121 and the second touch line 121. The second dummy touch line 122 is provided between the second touch line 121 and the third touch line 121. The third dummy touch line 122 is provided between the third touch line 121 and the fourth touch line 121.

In some embodiments, distribution manners and/or numbers of first vias P corresponding to two touch electrodes 11 in a same column and adjacent to each other in the column direction are different. In this way, it is beneficial for the first vias P corresponding to the touch electrodes 11 in a same column to be dispersedly distributed in the second direction D2, thereby facilitating avoiding the concentration of the first vias P in the longitudinal direction.

For example, as shown in FIG. 2, the first column of touch electrodes 11 is taken as an example.

The distribution manners and/or the numbers of the first vias P corresponding to any two adjacent touch electrodes 11 in the column direction of the column of touch electrodes 11 are different. For example, the distribution manner of first vias P corresponding to the touch electrode 11 in the first column and the first row is different from that of first vias P corresponding to the touch electrode 11 in the first column and the second row.

Herein, the distribution manner of the first vias P corresponding to the touch electrode 11 refers to an arrangement manner of the first vias P corresponding to the touch electrode 11 on all the touch lines 121 and the dummy touch lines 122 coupled to the touch electrode 11. As shown in FIG. 2, for example, the touch electrode 11 in the first column and the first row corresponds to a total of 10 first vias P, which are distributed on the touch line 121 and the dummy touch lines 122 respectively from left to right with numbers of 3, 2, 3, and 2. As another example, the touch electrode 11 in the first column and the second row corresponds to a total of 10 first vias P which are distributed on the touch line 121 and the dummy touch lines 122 respectively from left to right with numbers of 2, 4, 1, and 3.

In some embodiments, the distribution manners of first vias P corresponding to the touch electrodes 11 in a same row are same, and the numbers of the first vias P corresponding to the touch electrodes 11 in the same row are same. In this way, it is beneficial to ensure the uniformity of the touch signals received by the touch electrodes 11 in the same row, thereby improving a touch performance. For example, as shown in FIG. 2, the distribution manners of the first vias P corresponding to the touch electrodes 11 of the first row of the touch electrodes 11 are same, and the numbers of the first vias P corresponding to the touch electrodes 11 of the first row of the touch electrodes 11 are same.

In embodiments of the present disclosure, the touch substrate 1A further includes a plurality of connection lines 14 which are configured to be used to couple together touch line(s) 121 and dummy touch line(s) 122 to which each of touch electrodes 11 that are coupled to touch lines 121 and dummy touch lines 122 is coupled.

In some embodiments, the plurality of connection lines, the plurality of touch lines and the plurality of dummy touch lines are arranged in a same layer. That is, the plurality of connection lines, the plurality of touch lines, and the plurality of dummy touch lines are arranged in a same conductive layer. In this way, the touch line(s) and the dummy touch line(s) to which each touch electrode is coupled may be directly joined together with at least one of the plurality of connection lines to realize a coupling therebetween. For example, each touch electrode is coupled to one touch line and three dummy touch lines, all of which are directly joined together with a connection line to realize the coupling between the touch line and the three dummy touch lines.

Figure 4:
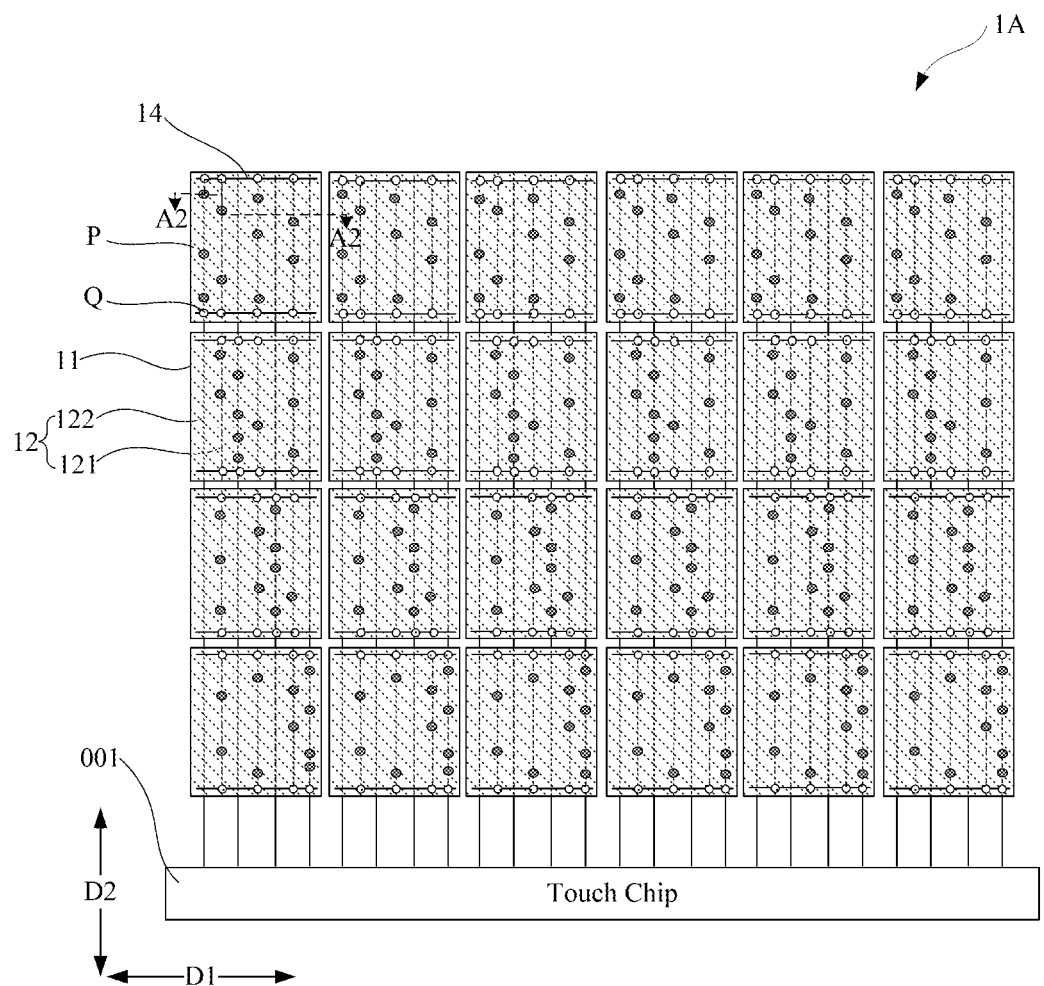
FIG. 4 is a top view of another touch substrate, according to some embodiments of the present disclosure.
Figure 5:
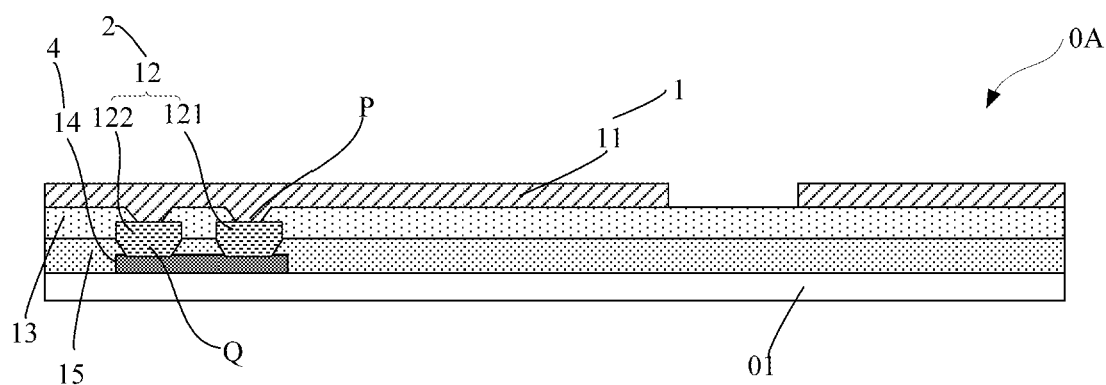
FIG. 5 is a schematic cross-sectional view of the touch substrate shown in FIG. 4 taken along the section line A2-A2, only showing two of the lines.

Referring to FIGS. 4 and 5, in some other embodiments, the plurality of connection lines 14 are arranged in a different layer from the plurality of touch lines 121 and the plurality of dummy touch lines 122. That is, the touch substrate 1A in the embodiments of the present disclosure further includes the plurality of connection lines 14 provided on a side of the plurality of signal lines 12 proximate to or away from the base 01. Stated differently, as shown in FIGS. 4 and 5, the touch substrate 1A in the embodiments of the present disclosure further includes a third conductive layer 4 provided on a side of the second conductive layer 2 proximate to or away from the base 01. The third conductive layer 4 includes the plurality of connection lines 14.

In the embodiments of the present disclosure, it is taken as an example for illustration that the plurality of connection lines 14 are arranged in a different layer from the plurality of touch lines 121 and the plurality of dummy touch lines 122.

In some embodiments, as shown in FIG. 5, the plurality of connection lines 14 are provided on a side of the plurality of signal lines 12 proximate to the base 01.

In some other embodiments, the plurality of connection lines 14 are provided on a side of the plurality of signal lines 12 away from the base 01.

With continued reference to FIGS. 4 and 5, for the touch electrodes 11 coupled with the touch lines 121 and the dummy touch lines 122, the touch line(s) 121 and the dummy touch line(s) 122 to which each of the touch electrodes 11 is coupled are coupled together through at least one of the plurality of connection lines 14. The touch line(s) 121 and the dummy touch line(s) 122 to which each of the touch electrodes 11 is coupled are coupled together so that the touch signals may be directly transmitted between the touch line(s) and the dummy touch line(s), improving a signal transmission speed on each electrode 11 and reducing a resistance of each touch electrode 11, thus further reducing the touch load of each touch electrode 11.

In some embodiments, the touch line(s) 121 and the dummy touch line(s) 122 coupled to the touch electrode 11 are coupled together through a connection line 14. In this way, on a premise that the touch line(s) 121 and the dummy touch line(s) 122 coupled to the touch electrode 11 are coupled, the wiring is relatively simple.

In some embodiments, the touch line(s) 121 and the dummy touch line(s) 122 coupled to the touch electrode 11 are coupled together through multiple connection lines 14 (which, by way of example, are illustrated to be two connection lines 14 in FIG. 4). In this way, the touch signals are transmitted through the multiple connection lines 14 between the touch line 121 and the dummy touch line 122 that are coupled to the touch electrode 11, which may improve the transmission speed and uniformity of the signals on the touch electrode 11. Therefore, a positioning speed and accuracy for the touch position are improved when the function of detecting the touch position of the touch substrate 1A is implemented, thus improving the touch sensitivity.

Referring to FIG. 5, in embodiments of the present disclosure, the touch substrate 1A further includes a second insulating layer 15 provided between the plurality of connection lines 14 and the plurality of signal lines 12. That is, the touch substrate 1A in the embodiments of the present disclosure further includes the second insulating layer 15 provided between the third conductive layer 4 and the second conductive layer 2.

In some embodiments, as shown in FIGS. 4 and 5, a plurality of second vias Q are provided in the second insulating layer 15.

The touch line(s) 121 coupled to the touch electrode 11 are coupled to at least one of the plurality of connection lines 14 through at least one of the plurality of second vias Q. The dummy touch line(s) 122 coupled to the touch electrode 11 are coupled to the at least one connection line 14 through at least one of the plurality of second vias Q.

For example, the touch electrode 11 is coupled to one touch line 121, which is coupled to one connection line 14 through one second via Q. The touch electrode 11 is coupled to three dummy touch lines 122 which are coupled to the connection line 14 through three second vias Q, respectively.

For example, the touch electrode 11 is coupled to a touch line 121 which is coupled to multiple connection lines 14 through multiple second vias Q. For example, as shown in FIG. 4, the touch line 121 is coupled to two connection lines 14 through two second vias Q. The touch electrode 11 is coupled to three dummy touch lines 122, each of which is coupled to the multiple connection lines 14 through multiple second vias Q. For example, as shown in FIG. 4, each of the three dummy touch lines 122 is coupled to the two connection lines 14 through two second vias Q, respectively.

In some embodiments, an extension direction of the plurality of signal lines 12 intersects with an extension direction of the plurality of connection lines 14.

For example, as shown in FIG. 4, each of the plurality of signal lines 12 extends in the second direction D2. That is, each of the plurality of touch lines 121 and each of the plurality of dummy touch lines 122 extends in the second direction D2. Each of the plurality of connection lines 14 extends in the first direction D1.

The touch substrate 1A in the embodiments of the present disclosure may be integrated with a display screen to form a touch display screen, and the integration types include but are not limited to the following:

I. Add-on type: the touch substrate 1A is individually attached to the display screen.

II. On-cell type: the touch structure of the touch substrate 1A is formed on an outer side of a substrate of the display screen, that is, the touch substrate 1A and the display screen shares the base 01 of the touch substrate or the substrate of the display screen.

III. In-cell type: the touch structure of the touch substrate 1A is integrated into the display screen.

The in-cell touch substrate will be explained in combination with some embodiments below.

Figure 7:
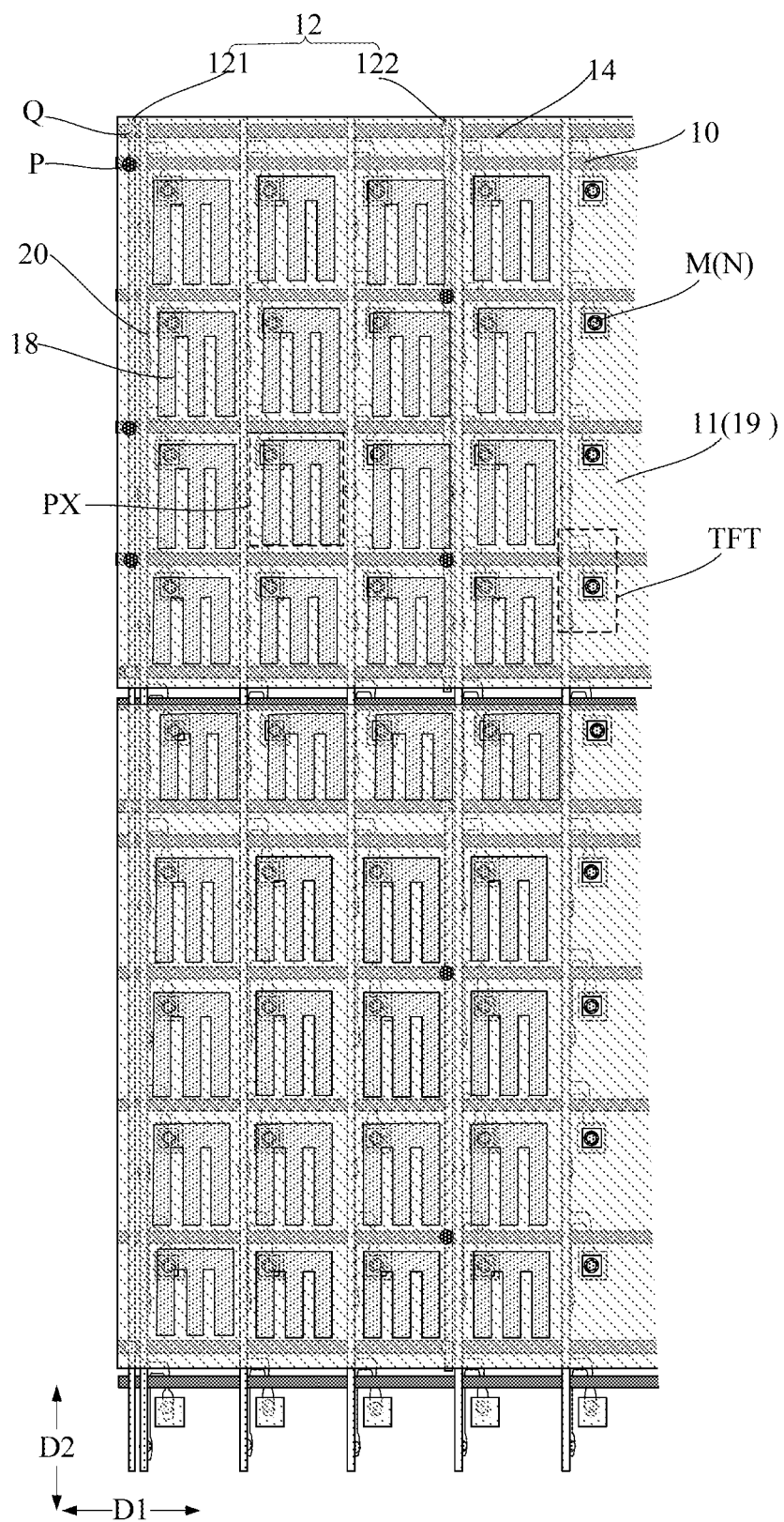
FIG. 7 is a layout diagram of part c of the touch substrate shown in FIG. 6.
Figure 8:
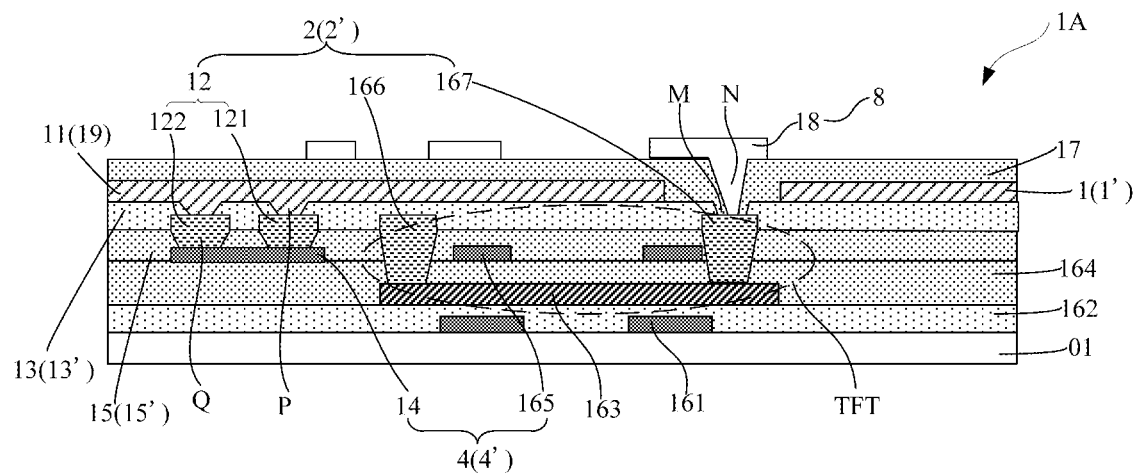
FIG. 8 is a schematic cross-sectional view of the touch substrate shown in FIG. 6 at part c, only showing two of the lines.

In some embodiments, as shown in FIGS. 7 and 8, the touch substrate A in the embodiments of the present disclosure includes a plurality of sub-pixels PX each of which includes a thin film transistor TFT and a pixel electrode 18 that are disposed on the base 01.

Figure 6:
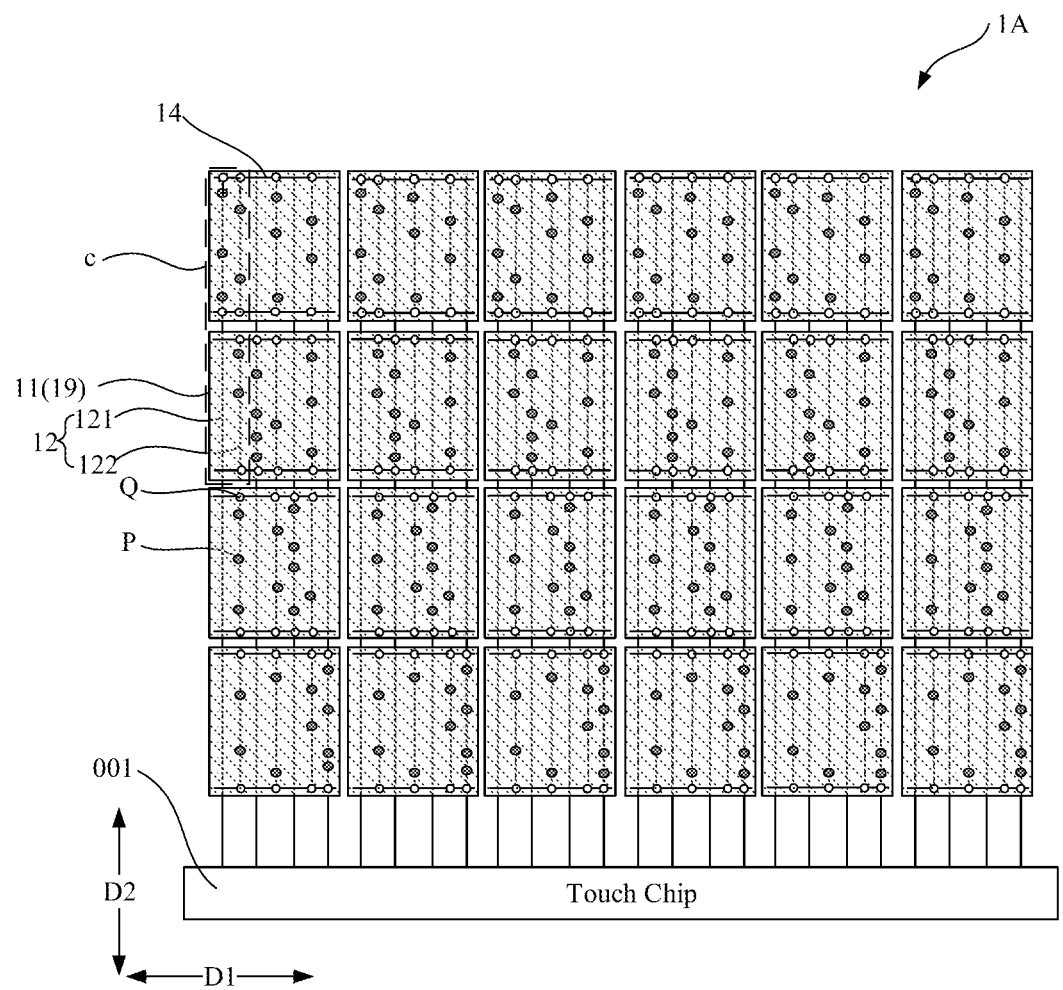
FIG. 6 is a top view of yet another touch substrate, according to some embodiments of the present disclosure.

Referring to FIGS. 6 to 8, the plurality of touch electrodes 11 of the touch substrate 1A are configured to transmit common voltage signals, so that the plurality of touch electrodes 11 are also used as common electrodes 19.

For example, the touch substrate 1A in the embodiments of the present disclosure further includes a common voltage terminal. The plurality of touch electrodes 11 are coupled to the common voltage terminal, so that the plurality of touch electrodes 11 are also used as the common electrodes 19. The common voltage signals are transmitted to the respective common electrodes 19 through the common voltage terminal, so that the common electrodes 19 cooperate with the pixel electrodes 18 of the plurality of sub-pixels PX to form electric fields, so as to drive the sub-pixels PX of the touch substrate 1A for displaying.

Thus, in this embodiment, a driving process of the touch substrate 1A includes a plurality of driving cycles each of which includes a touch phase and a display phase. In the touch phase of driving the touch substrate 1A, the touch signals are transmitted between the plurality of touch electrodes 11 and the touch chip 001, so as to realize a detection of the touch position. In the display phase of driving the touch substrate 1A, the plurality of touch electrodes 11 transmit the common voltage signals received at the common voltage terminal, and cooperate with the pixel electrodes 18 of the plurality of sub-pixels PX to form the electric fields, so as to drive the sub-pixels PX of the touch substrate 1A for displaying.

That is, the plurality of touch electrodes 11 have both a function of driving the sub-pixels for displaying and a function of detecting the touch position, which realizes the multiuse of the plurality of touch electrodes 11. Thus, compared with the related art in which common electrodes for realizing a display function and touch electrodes for realizing a function of detecting a touch position are provided, in the touch substrate in the embodiments of the present disclosure, an overall thickness of the touch substrate 1A may be reduced and an internal structure of the touch substrate 1A may be simplified.

The first conductive layer 1 where the plurality of touch electrodes 11 are located may be provided between the thin film transistor TFT and a pixel electrode layer 8 where the pixel electrodes 18 are located, or provided on a side of the pixel electrode layer 8 away from the base 01.

It can be known from the foregoing that in the embodiments of the present disclosure, the plurality of touch electrodes 11 are independent block electrodes. One touch electrode 11 (i.e., the common electrode 19) may correspond to one pixel electrode 18. Alternatively, as shown in FIG. 7, one touch electrode 11 (i.e., common electrode 19) may also correspond to a plurality of adjacent pixel electrodes 18.

As shown in FIG. 8, the thin film transistor TFT includes a gate 165, an active layer 163, a source 166, and a drain 167. The source 166 and the drain 167 are in contact with the active layer 163. The drain 167 is electrically connected to the pixel electrode 18. A conductive layer where the gate 165 is located is a gate electrode layer 4', and a conductive layer where the source 166 and the drain 167 are located is a source-drain electrode layer 2'.

It can be understood that the source-drain electrode layer 2' includes a plurality of sources 166 and a plurality of drains 167. In addition, the source-drain electrode layer 2' further includes a plurality of data lines (the data lines are not shown in FIG. 8).

Referring to FIG. 7, in some embodiments, the plurality of signal lines 12 are parallel to the plurality of data lines 20. That is, the touch lines 121, the dummy touch lines 122 and the data lines 20 extend in a same direction. For example, the touch lines 121, the dummy touch lines 122, and the data lines 20 each extend in the second direction D2.

In some embodiments, the plurality of touch lines 121 and the plurality of dummy touch lines 122 are located in the source-drain electrode layer 2'. That is, the second conductive layer 2 and the source-drain electrode layer 2' refer to a same conductive layer. That is, the plurality of touch lines 121 and the plurality of dummy touch lines 122 are in a same layer as the plurality of data lines 20, and are of a same material as the plurality of data lines 20. Thus, the touch lines 121, the dummy touch lines 122, the sources 166, the drains 167, and the data lines 20 may be formed by a same patterning process, so that there is no need to additionally set the steps of forming the touch lines 121 and the dummy touch lines 122, which achieves the effect of simplifying the manufacturing process of the touch substrate 1A.

It can be understood that the touch lines 121, the dummy touch lines 122, the sources 166, the drains 167, and the data lines 20 are electrically insulated from each other.

It can be understood that, as shown in FIG. 8, the gate electrode layer 4' includes a plurality of gates 165. In addition, the gate electrode layer 4' further includes a plurality of gate lines (the gate lines are not shown in FIG. 8).

Referring to FIG. 7, in some embodiments, the plurality of connection lines 14 are parallel to the plurality of gate lines 10. That is, the connection lines 14 extend in a same direction as the gate lines 10. For example, the connection lines 14 and the gate lines 10 all extend in the first direction D1.

In some embodiments, the plurality of connection lines 14 are located in the gate electrode layer 4'. That is, the third conductive layer 4 and the gate electrode layer 4' refer to a same conductive layer. Stated differently, the plurality of connection lines 14 are in a same layer as the plurality of gate lines 10, and are of a same material as the plurality of gate lines 10. Thus, the connection lines 14, the gates 165, and the gate lines 10 may be formed by a same patterning process, so that there is no need to additionally set a step of forming the connection lines 14, which achieves the effect of simplifying the manufacturing process of the touch substrate 1A.

It can be understood that the connection lines 14, the gates 165 and the gate lines 10 are electrically insulated from each other.

Based on this, since the gate electrode layer 4' and the source-drain electrode layer 2' are film layers in the touch substrate 1A that are used to form the thin film transistors TFT, the gate lines and the data lines, the plurality of connection lines 14 may be provided in the gate electrode layer 4' and the plurality of touch lines 121 and the plurality of dummy touch lines 122 may be provided in the source-drain electrode layer 2' just by designing their patterns and connection relationships as described above, thereby realizing the touch function without adding a new conductive layer. That is, with a preparation of the plurality of connection lines 14 being compatible with that of the gate electrode layer 4' and a preparation of the plurality of touch lines 121 and the plurality of dummy touch lines 122 being compatible with that of the source-drain electrode layer 2', a structure for a touch can be integrated into the touch substrate 1A without adding a patterning process and the touch function can be realized.

In the touch substrate 1A, an insulating layer for isolation is provided between different conductive layers, for example, as shown in FIG. 8, a gate insulating layer 164 provided between the active layer 163 and the gate electrode layer 4', an interlayer insulating layer 15' provided between the gate electrode layer 4' and the source-drain electrode layer 2', a planarization layer 13' provided between the source-drain electrode layer 2' and a common electrode layer 1', and a passivation layer 17 provided between the pixel electrode layer 8 and the common electrode layer 1'.

The thin film transistor TFT in the embodiments of the present disclosure may be a bottom-gate thin film transistor, or a top-gate thin film transistor.

In some embodiments, as shown in FIG. 8, in a case where the thin film transistor TFT is the top-gate thin film transistor, the active layer 163, the gate insulating layer 164, the gate electrode layer 4', the interlayer insulating layer 15', the source-drain electrode layer 2', and the planarization layer 13' are sequentially provided on the base 01 in a direction perpendicular to the base 01 and directed from proximate to the base 01 toward away from the base 01. The common electrode layer 1', the pixel electrode layer 8 and the passivation layer 17 located therebetween are further provided on a side of the planarization layer 13' away from the base 01. The common electrode layer 1' may be closer to or further away from the base 01 relative to the pixel electrode layer 8. In the drawings of the embodiments of the present disclosure, it is taken as an example for illustration that the common electrode layer 1' is closer to the base 01 relative to the pixel electrode layer 8.

It can be seen that based on the structure described above, an insulating layer, i.e., the interlayer insulating layer 15', is provided between the source-drain electrode layer 2' and the gate electrode layer 4'. An insulating layer, i.e., the planarization layer 13', is provided between the common electrode layer 1' and the source-drain electrode layer 2'. That is, in a case where the third conductive layer 4 is the gate electrode layer 4' and the second conductive layer 2 is the source-drain electrode layer 2', for the touch substrate 1A with the top-gate thin film transistors, the first insulating layer 13 located between the first conductive layer 1 and the second conductive layer 2 is the planarization layer 13', and the second insulating layer 15 located between the third conductive layer 4 and the second conductive layer 2 is the interlayer insulating layer 15'.

In some embodiments, in a case where the thin film transistor TFT is the bottom-gate thin film transistor, the gate electrode layer, the gate insulating layer, the active layer, the source-drain electrode layer, and the planarization layer are sequentially provided on the base in the direction perpendicular to the base and directed from proximate to the base toward away from the base. The common electrode layer, the pixel electrode layer, and the passivation layer located therebetween are further provided on the side of the planarization layer away from the base. The common electrode layer may be closer to or further away from the base relative to the pixel electrode layer.

It can be seen that based on the structure described above, an insulating layer, i.e., the gate insulating layer, is provided between the source-drain electrode layer and the gate electrode layer. An insulating layer, i.e., the planarization layer, is provided between the common electrode layer and the source-drain electrode layer. That is, in a case where the third conductive layer is the gate electrode layer and the second conductive layer is the source-drain electrode layer, for the touch substrate with the bottom-gate thin film transistors, the first insulating layer located between the first conductive layer and the second conductive layer is the planarization layer, and the second insulating layer located between the third conductive layer and the second conductive layer is the gate insulating layer.

A method for manufacturing the touch substrate is described below by taking an example where the thin film transistor TFT of the touch substrate 1A in the embodiments of the present disclosure is the top-gate thin film transistor with reference to FIG. 8.

It can be understood that the method for manufacturing the touch substrate A in the embodiments of the present disclosure involves but is not limited to the following.

The method for manufacturing the touch substrate 1A in embodiments of the present disclosure includes S1 to S5.

In S1, the gate electrode layer 4' is formed on the base 01 through one patterning process. The gate electrode layer 4' includes the plurality of gate lines, gates 165 of the plurality of the thin film transistors, and the plurality of connection lines 14.

In S2, the interlayer insulating layer 15' is formed on aside of the gate electrode layer 4' away from the base 01, and includes the plurality of first vias P.

In S3, the source-drain electrode layer 2' is formed on a side of the interlayer insulating layer 15' away from the base 01 through one patterning process. The source-drain electrode layer 2' includes the plurality of touch lines 121, the plurality of dummy touch lines 122, sources 166 of the plurality of the thin film transistors, drains 167 of the plurality of the thin film transistors, and the plurality of data lines.

Each of the plurality of touch lines 121 and each of the plurality of dummy touch lines 122 is electrically connected to some of the plurality of connection lines 14 through some of the plurality of first vias P.

In S4, the planarization layer 13' is formed on a side of the source-drain electrode layer 2' away from the base 01, and includes the plurality of second vias Q.

In S5, the common electrode layer 1' is formed on the side of the planarization layer 13' away from the base 01. The common electrode layer 1' includes a plurality of common electrodes 19 (i.e., the touch electrodes 11).

Each of the plurality of common electrodes 19 is coupled to some of the touch lines 121 and some of the dummy touch lines 122 through some of the plurality of second vias Q.

The method for manufacturing the touch substrate 1A in embodiments of the present disclosure further includes S01 to S04 before S1.

In S01, a light-shielding layer 161 is formed on the base 01. An orthographic projection of the light-shielding layer 161 on the base 01 at least covers an area between the source 166 and the drain 167 of the thin film transistor TFT to be formed (i.e., an area where a channel is formed when the thin film transistor TFT works).

In S02, a buffer layer 162 is formed on a side of the light-shielding layer 161 away from the base 01.

In S03, active layers 163 of the plurality of the thin film transistors are formed on a side of the buffer layer 162 away from the base 01.

In S04, the gate insulating layer 164 is formed on aside of the active layers 163 of the plurality of the thin film transistors away from the base 01.

It should be noted that a source via for forming an electrical contact between the source 166 and the active layer 163 and a drain via for forming an electrical contact between the drain 167 and the active layer 163 are further provided in the interlayer insulating layer 15' and the gate insulating layer 164. During a formation of the source-drain electrode layer 2', the source 166 is in electrical contact with the active layer 163 through the source via, and the drain 167 is in electrical contact with the active layer 163 through the drain via.

The method for manufacturing the touch substrate 1A in embodiments of the present disclosure further includes S41, S6 and S7.

In S41, during the formation of the planarization layer 13', a plurality of vias M are formed in the planarization layer 13'.

In S6, the passivation layer 17 is formed on a side of the common electrode layer 1' away from the base 01, and includes a plurality of vias N penetrating the passivation layer 17.

In S7, the pixel electrode layer 8 is formed on a side of the passivation layer 17 away from the base 01. The pixel electrode layer 8 includes a plurality of pixel electrodes 18 each of which is in electrical contact with the drain 167 through the via N.

In the manufacturing method above, the common electrodes 19 (i.e., the touch electrodes 11) includes a transparent conductive material, such as a transparent metal, a transparent metal alloy, a transparent metal oxide, a carbon nanotube, or a graphene and the like. The light-shielding layer 161, the gate lines, the data lines, the connection lines 14, the touch lines 121, and the dummy touch lines 122 include a conductive metal material, such as aluminum, molybdenum or other conductive metal materials. The gate insulating layer 164, the interlayer insulating layer 15', the planarization layer 13', and the passivation layer 17 may include an inorganic material such as silicon oxide, silicon nitride, or silicon oxynitride, or an organic material such as a resin, or the like.

Figure 9:
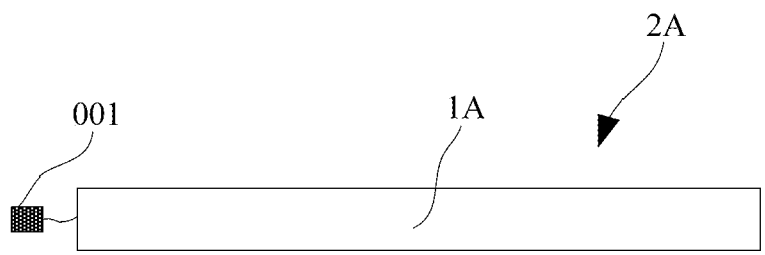
FIG. 9 is a diagram showing a structure of a touch screen, according to some embodiments of the present disclosure.

As shown in FIG. 9, some embodiments of the present disclosure further provide a touch screen 2A which includes the touch substrate 1A in any one of the embodiments. The touch screen 2A has same effects as the touch substrate 1A in the foregoing embodiments, which will not be repeated herein.

As shown in FIG. 9, the touch screen 2A further includes a touch chip 001.

Referring to FIGS. 2, 4, and 6, the touch chip 001 is coupled to the plurality of touch lines 121 of the touch substrate 1A. The touch chip 001 is configured to provide each of the plurality of touch lines 121 with a touch driving signal required for detecting a touch position, and to obtain a touch sensing signal from each touch line 121, so as to realize a determination of the touch position.

Figure 10:
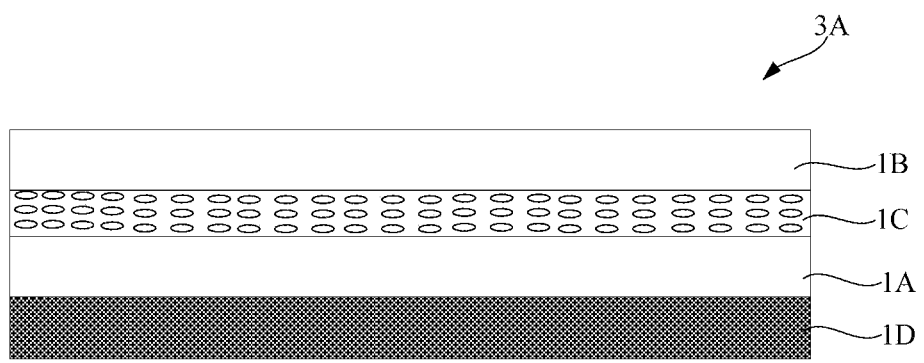
FIG. 10 is a side view showing a structure of a touch display apparatus, according to some embodiments of the present disclosure.

As shown in FIG. 10, some embodiments of the present disclosure further provide a touch display apparatus 3A which includes the touch substrate 1A in any one of the embodiments. The touch display apparatus 3A has same effects as the touch substrate 1A in the foregoing embodiments, which will not be repeated herein.

Referring to FIG. 10, in some embodiments, the touch display apparatus 3A is an in-cell display apparatus, and further includes an opposite substrate 1B arranged opposite to the touch substrate 1A.

With continued reference to FIG. 10, in some embodiments, the touch display apparatus 3A is a liquid crystal display apparatus which may further include a liquid crystal layer 1C located between the touch substrate 1A and the opposite substrate 1B.

For example, the opposite substrate 1B may be a color filter substrate. Alternatively, in a case where the touch substrate 1A is a color filter on array (COA) touch substrate, that is, in a case where the touch substrate 1A is provided with a color filter film, the opposite substrate 1B may be a cover plate, such as a cover glass.

In a case where the touch display apparatus 3A is the liquid crystal display apparatus, in the touch substrate 1A, each sub-pixel includes the pixel electrode and the common electrode. After the touch substrate 1A and the opposite substrate 1B are encapsulated to be a cell to form a liquid crystal display panel included in the liquid crystal display apparatus, the liquid crystal display panel may be an advanced-super dimensional switching (AD-SDS) panel, which enables aligned liquid crystal molecules between the electrodes and above the electrodes to be deflected in a plane direction parallel to a display surface of the display panel through a fringe electric field generated between the pixel electrode and the common electrode on the touch substrate 1A side. Therefore, a viewing angle may be increased, and a light transmission efficiency of the liquid crystal layer may be improved simultaneously.

The touch display apparatus 3A may further include a backlight module 1D that provides backlight, a driving circuit part, and the like, and specific structures will not be repeated herein.

The touch display apparatus 3A in the embodiments of the present disclosure may be any device that displays images, moving (e.g., videos) or stationary (e.g., still images), literal or graphical. More specifically, it is contemplated that the embodiments may be implemented in, or associated with, a variety of electronic devices. The variety of electronic devices include but are not limited to mobile phones, wireless devices, portable android devices (PADs), handheld or portable computers, global positioning system (GPS) receivers/navigators, cameras, MPEG-4 Part 14 (MP4) video players, camcorders, game consoles, watches, clocks, calculators, TV monitors, panel displays, computer monitors, car displays (e.g., odometer displays, etc.), navigators, cockpit controllers and/or displays, camera view displays (e.g., rearview camera displays in vehicles), electronic photographs, electronic billboards or signs, projectors, architectural structures, packagings, and aesthetic structures (e.g., displays for displaying an image of a piece of jewelry), etc.

The forgoing descriptions are merely specific implementation of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A touch substrate, comprising:
   a base;
   a plurality of touch electrodes arranged in an array on the base;
   a plurality of signal lines disposed on a side of the plurality of touch electrodes proximate to or away from the base, the plurality of signal lines comprising a plurality of touch lines and a plurality of dummy touch lines, all of which are arranged in a same layer;
   a first insulating layer disposed between the plurality of touch electrodes and the plurality of signal lines, a plurality of first vias being provided in the first insulating layer and
   a plurality of connection lines disposed on a side of the plurality of signal lines proximate to or away from the base,
   wherein at least one of the plurality of touch electrodes is coupled to at least one of the plurality of touch lines through at least one of the plurality of first vias,
   the at least one touch line is configured to transmit touch signals,
   the at least one touch electrode is coupled to at least one of the plurality of dummy touch lines through at least one of the plurality of first vias, and
   the touch line(s) and the dummy touch line(s) to which each of the at least one touch electrode is coupled are coupled together through at least one of the plurality of connection lines.

2. The touch substrate according to claim 1, wherein among a plurality of columns of touch electrodes formed by arranging the plurality of touch electrodes, at least one column of touch electrodes comprises n touch electrodes which are coupled to n of the plurality of touch lines, respectively,
   wherein n is greater than or equal to 2.

3. The touch substrate according to claim 1, wherein among first vias corresponding to the touch electrode, first vias corresponding to the touch line(s) and first vias corresponding to the dummy touch line(s) are staggered in a column direction.

4. The touch substrate according to claim 3, wherein among first vias corresponding to the touch electrode, at least one first via is not on a same straight line extending in a row direction as other first vias.

5. The touch substrate according to claim 1, wherein among touch lines coupled to the touch electrode, at least one touch line is coupled to the touch electrode through 2 to 3 first vias; and/or
   among dummy touch lines coupled to the touch electrode, at least one dummy touch line is coupled to the touch electrode through 2 to 3 first vias.

6. The touch substrate according to claim 1, wherein a contact area between at least one of the plurality of first vias and one touch line or dummy touch line is 15 µm$^2$ to 18 µm$^2$.

7. The touch substrate according to claim 1, wherein each of the at least one touch electrode is coupled to at least two of the plurality of dummy touch lines;
   for the touch line(s) coupled to the touch electrode and touch line(s) that pass the touch electrode but are not coupled to the touch electrode, a dummy touch line coupled to the touch electrode is disposed between two adjacent touch lines.

8. The touch substrate according to claim 7, wherein for the touch line(s) coupled to the touch electrode, touch line(s) that pass the touch electrode but are not coupled to the touch electrode, and at least two dummy touch lines coupled to the touch electrode, the touch lines and the dummy touch lines are alternately arranged at intervals.

9. The touch substrate according to claim 1, wherein distribution manners of first vias corresponding to two touch electrodes in a same column and adjacent to each other are different, and/or, numbers of the first vias corresponding to the two touch electrodes in the same column and adjacent to each other are different.

10. The touch substrate according to claim 9, wherein distribution manners of first vias corresponding to touch electrodes in a same row are the same, and numbers of the first vias corresponding to the touch electrodes in the same row are the same.

11. The touch substrate according to claim 1, further comprising:
a second insulating layer disposed between the plurality of connection lines and the plurality of signal lines, a plurality of second vias being provided in the second insulation layer, wherein
the touch line(s) coupled to the touch electrode are coupled to the at least one connection line through at least one of the plurality of second vias; and
the dummy touch line(s) coupled to the touch electrode are coupled to the at least one connection line through at least one of the plurality of second vias.

12. The touch substrate according to claim 1, wherein an extension direction of the plurality of signal lines intersects with an extension direction of the plurality of connection lines.

13. The touch substrate according to claim 1, wherein the plurality of touch electrodes are configured to transmit common voltage signals, so that the plurality of touch electrodes are also used as common electrodes.

14. The touch substrate according to claim 1, further comprising:
a plurality of data lines and a plurality of gate lines, wherein
the plurality of signal lines are parallel to the plurality of data lines; and the plurality of connection lines are parallel to the plurality of gate lines.

15. The touch substrate according to claim 14, wherein
the plurality of touch lines and the plurality of dummy touch lines are in a same layer as the plurality of data lines, and are of a same material as the plurality of data lines; and
the plurality of connection lines are in a same layer as the plurality of gate lines, and are of a same material as the plurality of gate lines.

16. A touch screen, comprising the touch substrate according to claim 1.

17. A touch display apparatus, comprising the touch substrate according to claim 1.

* * * * *

UNITED STATES PATENT AND TRADEMARK OFFICE
CERTIFICATE OF CORRECTION

PATENT NO. : 11,231,800 B2
APPLICATION NO. : 16/981153
DATED : January 25, 2022
INVENTOR(S) : Wu et al.

It is certified that error appears in the above-identified patent and that said Letters Patent is hereby corrected as shown below:

On the Title Page

Insert item (30), as follows:
--(30) Foreign Application Priority Data
March 19, 2019 (CN) ................201910209523.X--

Signed and Sealed this
Fourth Day of October, 2022

Katherine Kelly Vidal
*Director of the United States Patent and Trademark Office*